June 6, 1961  L. E. FOGARTY  2,987,255
SERVO MULTIPLIER
Filed Jan. 4, 1957
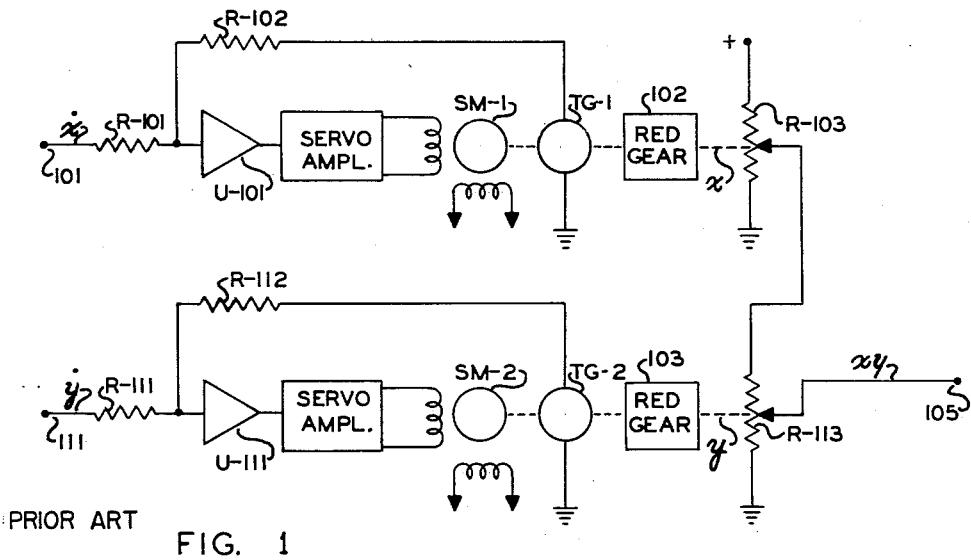
PRIOR ART  FIG. 1
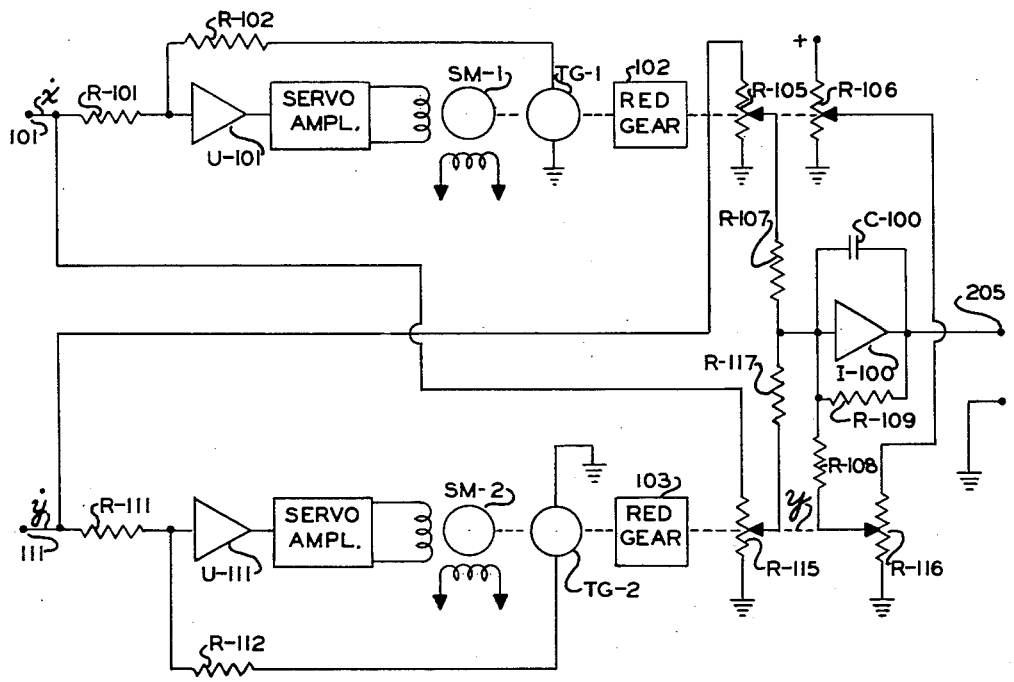
FIG. 2
LAURENCE E FOGARTY
INVENTOR
BY *Darby & Darby*
ATTORNEY

United States Patent Office 2,987,255
Patented June 6, 1961

2,987,255
SERVO MULTIPLIER
Laurence E. Fogarty, Binghamton, N.Y., assignor to General Precision Inc., a corporation of Delaware
Filed Jan. 4, 1957, Ser. No. 632,524
2 Claims. (Cl. 235—194)

This invention relates to analog computer apparatus and more specifically, to improved electrical analog computer apparatus for multiplying independent variables which vary with time. In the analog computer, automatic control and instrumentation arts, much apparatus is arranged to solve various differential equations, and since such equations commonly involve numerous product terms, multiplications often must be made. Analog computer apparatus is recognized to be particularly effective for the analysis of involved systems, the operations of which are described by complex simultaneous differential equations, and to provide accurate simulation of such systems with an analog computer, it is necessary and desirable that each arithmetical operation performed by the computer be accurate both statically and dynamically, and be free, as much as possible, of "noise," i.e., inaccuracies and false signals due to limitations of the various computing elements.

A number of computer problems involve the multiplication of two quantities, each of which varies with time. If both such independent variables exist as voltages in the computer, a voltage commensurate with their product may be computed by means of one of a number of electronic multipliers known to the art, all of which such multipliers are complex, expensive, and of poor accuracy and reliability. If the product of two independent variable voltages is required in the form of a mechanical shaft position, the output voltage from any of the above-mentioned electronic multipliers must be converted by further provision of a position servo.

Often the differential equations solved by the computer require the computation of the product of two quantities, each of which quantities is derived by integration of a previous quantity which is the time rate of change of the quantity to be multiplied. In such a case the prior art generally has utilized apparatus which merely separately integrates each rate of change quantity and multiplies the two integrated quantities. Utilizing conventional analog computer elements, the prior art commonly has integrated two voltages representing rates of change of two conditions by means of two electro-mechanical integrators such as velocity servos, and then has used the mechanical output shaft positions of such integrators to position cascaded potentiometers to makes the desired multiplication. Where the time integral of one of the rate of change quantities has not been needed in mechanical form elsewhere in the computer, the prior art sometime has recognized the dynamic superiority of all-electronic integrators and has substituted an electronic integrator for one of the velocity servos. While some improvement has been obtained, the output voltage from such an arrangement is directly modified by a potentiometer driven by the remaining velocity servo integrator, so that noise due to granularity and backlash of the potentiometer is inherent in the product output signal. If such product output signals are connected in intricate analog computer loops, the noise may be considerably amplified and may combine with noise generated by other computing elements to cause very inaccurate and unstable computer operation. Where the analog computer is used as a machine or process simulator, the noise present in the computer may cause extremely unrealistic simulation. The invention provides means whereby a substantially noise-free multiplication may be made.

It is well known to those skilled in the art that analog computer, automatic control and instrumentation apparatus should be as accurate as is economically feasible, as well as being free from noise or instability, and that a high degree of dynamic accuracy as well as static accuracy is highly desirable, if not absolutely necessary, in most apparatus of the above-mentioned types. While some computer and simulator apparatus may be constructed utilizing greatly expanded or contracted time scales, various other apparatus must be constructed to operate in real time, so that stringent dynamic requirements arise due to dynamic limitations of computer elements. As well as providing output quantities which are "noisy," prior art multiplying apparatus has had poor dynamic accuracy due to the dynamic limitations of velocity servo integrators. Inasmuch as such servos have finite intertia, changes in input signals applied to such servos are reflected in properly changed servo velocity only after a certain time lag, so that product output quantities provided by means of two integrating servos in the above-mentioned manner are always in error as input potentials to the servos vary. While the invention also utilizes two velocity servos, the invention provides means for computing a product quantity with considerably less dynamic error.

Therefore, it is a primary object of the invention to provide improved analog computer, automatic control and instrumentation apparatus for providing an output quantity which is commensurate with the product of two independent time variable input quantities.

It is another object of the invention to provide improved computer apparatus for multiplying two input quantities to provide a product output quantity having considerably less noise due to limitations of computer components than prior art apparatus.

It is a further object of the invention to provide improved computer apparatus for multiplying two input quantities to provide a product output quantity having considerably less dynamic error than prior art apparatus.

It is a more specific object of the invention to provide improved electrical analog computer, automatic control and instrumentation apparatus operative in response to two input potentials varying with time to provide an output potential which is commensurate with the product of said variables, which potential is substantially free from noise, and has considerably improved dynamic accuracy.

It is a further object of the invention to provide apparatus of the above type which is not susceptible to drift.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGURE 1 is an electrical schematic diagram of a common prior art arrangement for computing the product of two time variables; and FIGURE 2 is an electrical schematic diagram of an exemplary embodiment of the invention.

Referring to FIGURE 1, there is shown in electrical schematic form, the apparatus commonly used in the prior art for providing computer quantity commensurate with the product of two independent variables which vary with time. A potential commensurate with $\dot{a}$ derived elsewhere in the computer is applied via terminal 101 through resistor R–101 to the input circuit of a conventional velocity servo integrator. The velocity servo comprises a comparing means shown as comprising amplifier U–101, a servo amplifier shown in block form, a motive means shown in FIGURE 1 as comprising an alternating current servo motor SM-1, and a rate feedback means shown as comprising tachometer generator TG-1. The output of the tachometer generator is applied via scaling resistor R-102 to the input circuit of the comparing means, thereby to derive the velocity servo error quantity, which is amplified by the servo amplifier so as to drive the servo motive means substantially at a speed proportional to the $\dot{x}$ input potential. As well as driving tachometer generator TG-1, the servo motor output shaft is connected mechanically, such as by means of reduction gearing shown in block form at 102, to drive a potentiometer R-103.

A similar velocity servo integrator is responsive to a $\dot{y}$ potential applied via terminal 111, and the second velocity servo drives the arm of potentiometer R-113. In order to provide an output potential which varies as the product $xy$, the potential on the arm of potentiometer R-103 is applied (often through a buffer amplifier, not shown) to excite the winding of potentiometer R-113. As is very well known in the art, this will provide an output potential at terminal 105 which is commensurate with the product $xy$. However, potentiometers R-103 and R-113 inherently have finite resolution, so that the $xy$ product potential available at terminal 105 will vary in finite steps as either or both of the quantities $x$ and $y$ vary. As mentioned above, such "noise" in the product potential may be extremely undesirable, and may adversely affect the overall-computer both statically and dynamically.

Referring now to FIGURE 2, there is shown an exemplary embodiment of the invention which utilizes input potentials commensurate with the rate of change of two independent time variables, and which is operative to produce an accurate and substantially noise-free output potential commensurate with the product of the two variables. The direct input potential commensurate with $\dot{x}$, the rate of change of the first independent variable, is applied at terminal 101 through scaling resistor R-101 to operate the first velocity servo integrator in conventional manner. Similarly, the $\dot{y}$ input potential commensurate with the rate of change of the second independent variable is applied from terminal 111 via scaling resistor R-111 to operate the second velocity servo integrator in conventional manner. The velocity servo integrators themselves operate in conventional manner, thereby providing shaft output positions substantially commensurate with the variables $x$ and $y$. The $\dot{x}$ potential commensurate with the rate of change of the first independent variable is also applied to excite potentiometer R-115, the arm of which is positioned by the $y$-variable velocity servo, thereby deriving a potential commensurate with $\dot{x}y$, which potential is applied via scaling resistor R-117 to the input circuit of an electronic integrator I-100, such as a Miller integrator, for example. The $\dot{y}$ potential commensurate with the rate of change of the second independent variable is also applied to excite the winding of potentiometer R-105, the arm of which is positioned by the $x$-variable velocity servo, thereby deriving a potential commensurate with the quantity $\dot{y}x$, which potential is applied via scaling resistor R-107 to the input circuit of integrator I-100. Being added at the input circuit of electronic integrator I-100, the sum of the potentials applied via summing resistors R-107 and R-117 is integrated with respect to time by electronic integrator I-100, thereby providing an output potential at terminal 205.

As may be recalled from elementary calculus, $$\frac{d(xy)}{dt} = x\frac{dy}{dt} + y\frac{dx}{dt}, \quad (1)$$

or $$\overline{(xy)} = x\dot{y} + y\dot{x} \quad (2)$$

$$(xy) = \int_0^t x\dot{y}\,dt + \int_0^t y\dot{x}\,dt \quad (3)$$

$$xy = \int_0^t [x\dot{y}\,dt + y\dot{x}\,dt] \quad (4)$$

Hence it will be seen that the output potential at terminal 205 will be commensurate with the product of the variables $x$ and $y$. Since the product output potential is derived from the output circuit of an electronic integrator, the product output quantity is substantially free from noise. For example, assume that one or both of the input potentials derived by potentiometers R-105 and R-117 is or are "noisy" due to poor potentiometer resolution. The discrete changes in voltage as a potentiometer arm passes from turn to turn of its associated winding will cause discrete amplitude variations at the input of electronic integrator I-100, but the integrator "smooths" the input potentials, since discrete changes in input potential amplitude only cause changes in the slope of the output potential at terminal 205. Hence the noise generated by finite potentiometer resolution is substantially eliminated from the output potential at terminal 205.

In some applications of the invention, the problems solved by the computer may involve such long periods of time that drift of electronic integrator I-100 may adversely affect computer accuracy. In those applications of the invention in which drift may become a problem, I choose to provide a drift compensating circuit, such as is shown in FIGURE 2. Potentiometers R-106 and R-116 are positioned by the first and second velocity servo output shafts, respectively, and these potentiometers are cascaded so that the potential on the arm of potentiometer R-116 is commensurate with the product of the two variables. This potential is applied via scaling resistor R-108 to the input circuit of electronic integrator I-100. Also applied to the input circuit of electronic integrator I-100 is a degenerative feedback potential applied via resistor 109. Resistors R-108 and R-109 are of relatively high impedance compared to resistors R-107 and R-117, so that the potentials applied through the drift compensating resistors R-108 and R-109 are small compared to the computing potentials applied through resistors R-107 and R-117. Assume that the velocity servo integrators are positioned at steady values of the $x$ and $y$ variables, so that a steady output potential exists on terminal 205. Under such conditions, no input potentials will be applied through resistors R-107 and R-117, and hence the integrator output potential will remain at a level so that the potential feedback via resistor R-109 exactly cancels the potential applied to the integrator via resistor R-108. If the integrator begins to drift, the difference between the two potentials applied via R-108 and R-109 will cause the integrator to correct itself. Although the drift compensating potential derived by potentiometers R-106 and R-116 is itself "noisy," due to the limited resolution of these potentiometers, such small currents are needed through resistors R-108 and R-109 to correct integrator drift that the "noisy" potential derived by potentiometers R-106 and R-116 may be made insignificant in magnitude compared to the input potentials applied via scaling resistors R-107 and R-117. Furthermore, any amplitude noise provided by the potentiometer-derived drift correction potential appears only as a change in slope at the output of electronic integrator I-100.

The above descriptions of the operations of both the prior art apparatus and the invention assumed perfect operation of the velocity servo integrators in that they were assumed to have no acceleration errors. Appreciable acceleration errors are characteristic of almost all velocity servos, however, and one of the very important advantages of the present invention is the considerable increase of accuracy of computed product potentials.

Designating $x_s$ and $y_s$ as the instantaneous output shaft positions of the $x$-variable and $y$-variable velocity servos, respectively, it will be seen that the output product potential produced by the prior art multiplying apparatus is proportioned to the product $x_s y_s$. The instantaneous output shaft positions may be defined as follows:

$$x_s = x - e_x \tag{5}$$

$$y_s = y - e_y \tag{6}$$

wherein $e_x$ and $e_y$ represent lag or acceleration errors of the $x$ and $y$ velocity servos, respectively.

Differentiating with respect to time:

$$\dot{x}_s = \dot{x} - \dot{e}_x \tag{7}$$

$$\dot{y}_s = \dot{y} - \dot{e}_y \tag{8}$$

The time rate of change of the output potential from prior art apparatus may be written as follows:

$$\frac{d}{dt} x_s y_s = \dot{x}_s y_s + \dot{y}_s x_s \tag{9}$$

Substituting equations 5 through 8 into Expression 9:

$$\frac{dx_s y_s}{dt} = (\dot{x} - \dot{e}_x)(y - e_y) + (\dot{y} - \dot{e}_y)(x - e_x) \tag{10}$$

$$\frac{dx_s y_s}{dt} = \dot{x}y - \dot{e}_x y - \dot{x}e_y + \dot{e}_x e_y + \dot{y}x - x\dot{e}_y - \dot{y}e_x + e_x \dot{e}_y \tag{11}$$

The theoretically correct rate of change of a product $xy$ is the quantity $(\dot{x}y + \dot{y}x)$, so subtracting this quantity from the above expression indicates that the time rate of change of the output potential from prior art apparatus is in error by the following net amount:

$$-\dot{e}_x y - x\dot{e}_y + \dot{e}_x e_y - x\dot{e}_y - \dot{y}e_x + e_x \dot{e}_y \tag{12}$$

Inasmuch as an electronic integrator may be constructed to operate without appreciable lag, the rate of change of the output potential from apparatus constructed in accordance with the invention will be commensurate with the input potentials applied to the electronic integrator. Re-writing Expression 4 with the subscript "$s$" added to denote servo instantaneous shaft positions, it will be seen that the rate of change of the product output potential from the invention may be expressed as follows:

$$\dot{x}y_s + \dot{y}x_s \tag{13}$$

Substituting from Equations 5 and 6, the quantity may be written:

$$\dot{x}y - \dot{x}e_y + \dot{y}x - \dot{y}e_x \tag{14}$$

Comparing the above quantity with the theoretically correct quantity $(\dot{x}y + \dot{y}x)$, it will be seen that the rate of change of the output quantity computed by use of the invention is in error by the amount:

$$-\dot{x}e_y - \dot{y}e_x \tag{15}$$

Comparing this error in the time derivative of the output quantity of the invention with the error in the time derivative of the prior art output quantity as expressed in (12), it will be seen that the invention is more accurate by the following amount:

$$-\dot{e}_x y - \dot{x}e_y + \dot{e}_x e_y + e_x \dot{e}_y \tag{16}$$

It will be obvious without further mathematics, that since the time rate of change of the output quantity of the invention is considerably more accurate, that the dynamic response of the invention is considerably better than that of prior art apparatus.

The invention may be applied to direct current analog computers and like apparatus without regard to the precise nature of the velocity servo integrators used. In most applications alternating current servomotors are preferred, and this type has been indicated schematically in the drawings herein. The servo amplifiers utilized may comprise vacuum tube amplifiers, magnetic amplifiers, or other known types. If alternating current vacuum tube amplifiers are used, the velocity servos must incorporate means for modulating the servo input signals at the frequency of the excitation applied to the servomotor quadrature windings, as is well known in the art. The velocity servos utilized may incorporate numerous known refinements, none of which have been shown since they do not in themselves constitute part of the present invention. Also, while electronic integrator I-100 has been shown merely as comprising an operational amplifier having a capacitor connected in its feedback circuit, numerous other types of electronic integrators utilizing a number of known refinements may be substituted.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Analog computer apparatus for providing a product output potential commensurate with the product of two independent time variables, comprising in combination, a first velocity servomechanism responsive to an input potential commensurate with rate of change of a first of said independent variables for providing a first mechanical shaft position commensurate with said first of said independent variables, a second velocity servomechanism responsive to a second potential commensurate with rate of change of a second of said two independent variables for providing a second mechanical output position commensurate with said second independent variable, a potentiometer excited by said second input potential and operable to modify said second input potential in accordance with said first shaft position to provide a third potential, a second potentiometer excited by said first input potential and operable to modify said first input potential in accordance with said second shaft position to provide a fourth potential, and an electronic integrator responsive to said third and fourth potentials and operable to provide said output potential, said product output potential being commensurate with the time integral of the sum of said third and fourth potentials.

2. Apparatus according to claim 1, having third and fourth potentiometers positioned by said first and second servomechanisms, respectively, for providing a further potential commensurate with the product of said two independent time variables, means for applying said further potential to the input circuit of said electronic integrator, and a feedback circuit associated with said electronic integrator to apply a fourth potential commensurate with said product output potential to the input circuit of said electronic integrator.

References Cited in the file of this patent

UNITED STATES PATENTS 2,784,501   Stern et al. _____ Mar. 12, 1957

OTHER REFERENCES

Electronic Instruments (Greenwood et al.), 1948, pages 56, 79, 86 and 87.

Electronic Analog Computers (Korn and Korn), 1952, p. 143.

Control Engineering (Davis), November 1954, p. 45.